United States Patent [19]
Nickels et al.

[11] Patent Number: 5,411,102
[45] Date of Patent: May 2, 1995

[54] GRADER BLADE ATTACHMENT FOR SMALL TRACTORS

[76] Inventors: Dean R. Nickels, 11-429 Road J, Malinta, Ohio 43535; Norman R. Nickels, 1-249 Road M, McClure, Ohio 43534

[21] Appl. No.: 115,912

[22] Filed: Sep. 1, 1993

[51] Int. Cl.6 .................................................. E02F 3/76
[52] U.S. Cl. ................................ 172/781; 172/273; 172/796; 172/247; 172/815; 37/231; 37/243; 37/268; 37/281
[58] Field of Search ............... 172/781, 780, 788, 296, 172/297, 273, 272, 274, 275, 799.5, 247, 253, 815, 438, 677, 679; 37/231, 241, 243, 266, 268, 279, 281, 283, 284, 285, 412, 381; 86/DIG. 9, 15.5; 294/60; 403/109; 280/688; 180/209, 906; 414/686

[56] References Cited

U.S. PATENT DOCUMENTS

| | | | |
|---|---|---|---|
| 1,531,751 | 3/1925 | Meana | 294/60 |
| 1,658,963 | 2/1928 | Bergquist | 294/60 |
| 3,206,879 | 9/1965 | Grover | 172/815 |
| 3,422,553 | 1/1969 | Holloway | 37/231 |
| 3,858,662 | 1/1975 | Reid | 172/781 |
| 4,122,903 | 10/1973 | Cole | 172/781 |
| 4,148,365 | 4/1979 | Anderson | 172/781 |
| 4,245,707 | 1/1981 | McClendon | 172/788 |
| 4,304,307 | 12/1981 | Anderson | 172/796 |
| 4,723,609 | 2/1988 | Curtis | 172/815 |
| 4,790,085 | 12/1988 | Rassinan | 37/231 |

*Primary Examiner*—Randolph A. Reese
*Assistant Examiner*—Spencer Warnick
*Attorney, Agent, or Firm*—Marshall & Melhorn

[57] ABSTRACT

A grader blade unit is provided for ready attachment to small tractors in place of an underslung mower deck. A grader blade is attached to a turntable for pivotable adjustment to selected angular settings. An extensible draw bar affixed to the turntable has a front mounting yoke at its forward end. A rear mounting yoke is affixed to the turntable. The front and rear mounting yokes are adjustable in width and the drawbar is adjustable in length so as to accommodate the mounting links of different tractors. Wing sections hingedly connected to the opposite ends of the central blade are adjustable to selected angular positions relative to the central blade. Foot stirrups are removably affixed to the blade for controlling the slope of the blade in use.

12 Claims, 2 Drawing Sheets

GRADER BLADE ATTACHMENT FOR SMALL TRACTORS

BACKGROUND OF THE INVENTION

1. Field of the Invention

The invention relates generally to a scraper or grader blade, and more particularly to a readily detachable device for attachment to small riding tractors of the so-called lawn or garden type for moving and levelling loose granular of pulverulent material.

2. Description of the Prior Art

In recent years small riding tractors for use in garden and lawn maintenance have become increasingly popular. Some of these tractors employ mechanisms for mounting a mower deck or other attachment ahead of the tractor, while others mount the mower deck beneath the tractor frame between the front and rear wheels in a so-called underslung or belly-mounted position. Blade or scraper attachments of various types for mounting in place of the front mounted mowers have been provided for various purposes, including plowing snow and grading and levelling material. Other units have been adapted for front mounting on tractors having underslung mowers or other attachments. However, these front mounted units have not proven entirely satisfactory for use in the grading and leveling of heavier material such as earth and crushed stone. The position of the blade can not be adequately controlled, and the blade tends to either gouge into the ground and stall the tractor or to ride up and over the material to be graded.

SUMMARY OF THE INVENTION

In accordance with the invention, there is provided a grader blade unit which can be readily mounted on and removed from small tractors in place of an underslung lawn mower deck or other attachment. The unit utilizes the mounting and lift mechanism by which the mower deck is normally attached to the tractor. Brackets or yokes are provided for connecting the grader blade unit to the links or the tractor mounting and lift system. A transversely extending grader blade is mounted for limited pivoting movement about a vertical axis for adjusting the angular disposition of the blade relative to the direction of advance of the tractor. Adjustable wings are hingedly connected to each end of the grader blade, and adjusting clamps are provided for setting the wings at selected angles relative to the blade. Stirrups are provided on the blade on either side of the tractor for receiving the feet of the driver to apply pressure and assist in maneuvering the blade. The height of the blade above the ground can be set by manipulation of the adjusting mechanism on the tractor for setting the cutting height of the mower deck.

BRIEF DESCRIPTION OF THE DRAWINGS

In the drawings, wherein like numerals refer to like parts throughout the same.

DESCRIPTION OF THE PREFERRED EMBODIMENT

Figure 1:
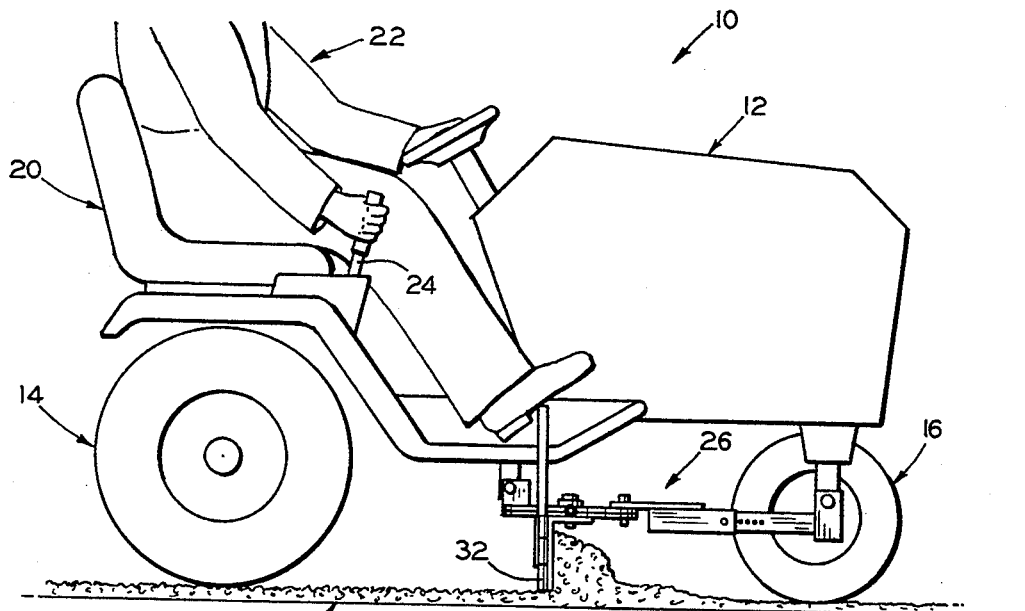
FIG. 1 is a side elevation, schematically illustrating a lawn tractor with a grader blade unit in accordance with the invention mounted on the tractor in place of the mower deck.

Referring now to the drawings, and particularly to FIG. 1, there is shown generally at 10 a typical lawn tractor as commonly employed by many present day residential occupants. Such tractors are available from a number of well known sources, and generally are of similar construction including a chassis 12 carried upon pairs of rear traction wheels 14 and forward steerable wheels 16 for conveying the unit along a supporting surface 18. The chassis 12 includes a seat 20 upon which an operator 22 rides for driving the tractor and manipulating the grader blade as will be hereinafter explained. A lever 24 mounted upon the chassis 12 is conventionally operably connected through a suitable linkage mechanism and mounting links for conventionally attaching a mower deck (not shown) beneath the chassis and intermediate the front and rear wheels in the so-called underslung or belly position. The lever enables the operator to manually vertically position the mower deck at selected heights relative to the supporting surface. As illustrated in FIG. 1, the mower deck has been replaced by a grader blade unit 26 constructed in accordance with the invention.

Figure 2:
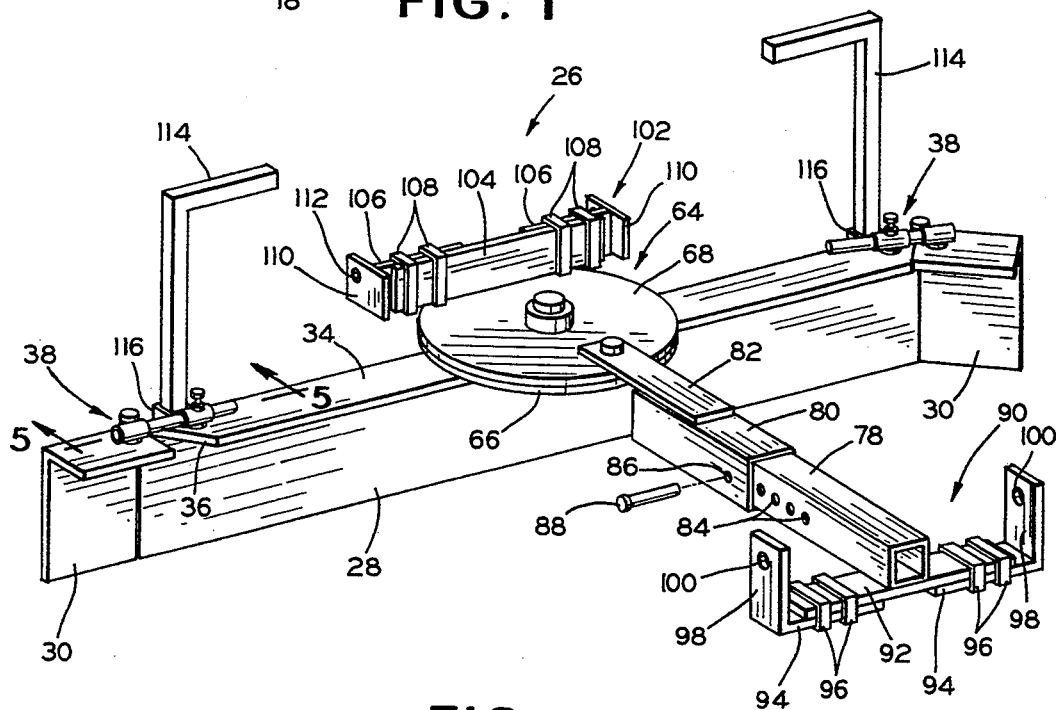
FIG. 2 is a perspective view of the grader blade unit of the invention.
Figure 3:
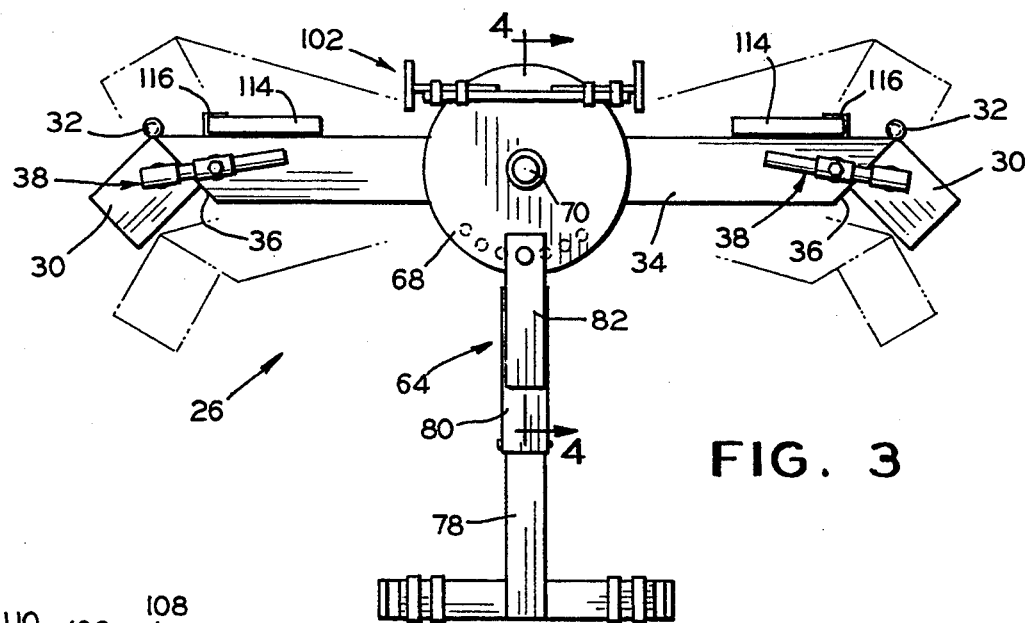
FIG. 3 is a top plan view of the unit, with alternative angular positions of the blade shown in phantom.
Figure 4:
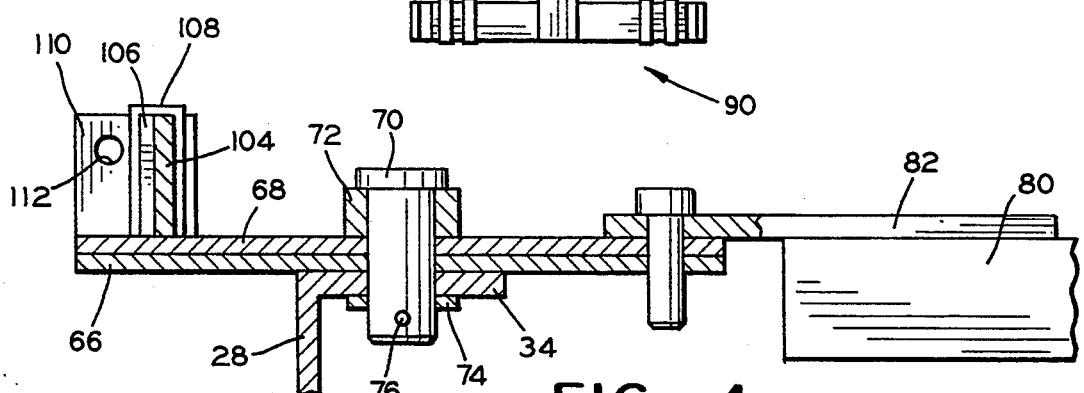
FIG. 4 is a fragmentary vertical section taken substantially along line 4—4 of FIG. 3.

As heretofore indicated the grader blade unit is constructed so as to be readily mounted upon the tractor in place of the mower deck by merely removing pins to disconnect the mower deck, and then positioning the grader blade unit and reinserting the pins. To that end, as best seen in FIG. 2 the grader blade unit 26 comprises a central blade 28, preferably in the form of an inverted L-shaped angle section. Wing sections 30 are pivotably attached to each end of the central blade section as by suitable hinge members 32. In order to permit the wing sections to be swung forwardly to selected angular positions relative to the central blade section for containing the graded material as the blade advances, the corners of the top flange 34 of the central blade adjacent the wing sections are cut away at an angle as at 36 (Figs. 2 and 3).

Figure 5:
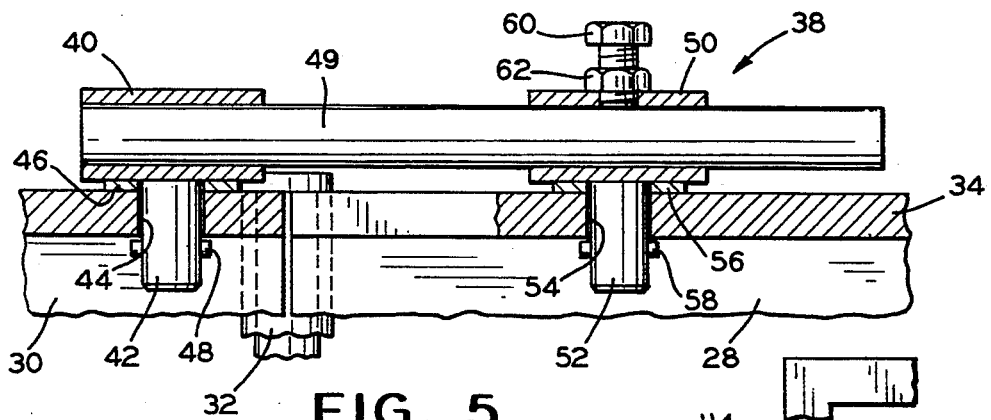
FIG. 5 is a fragmentary vertical section taken substantially along line 5—5 of FIG. 2.
Figure 6:
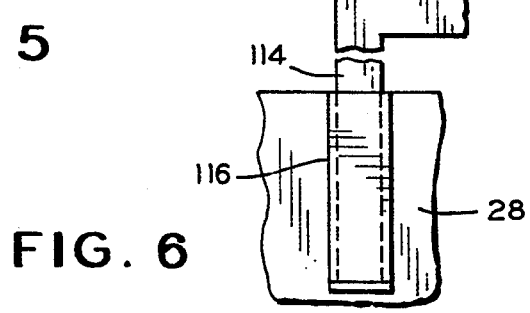
FIG. 6 is a fragmentary elevation, with parts broken away, illustrating a mounting pocket for a footrest or stirrup.

Adjustable clamping devices, identified generally at 38, are provided for securing the sections 30 in selected angular positions. As best seen in FIGS. 2 and 5, the clamping devices may suitably comprise a collar 40 having a pivot pin 42 secured thereto and extending through an opening 44 in the top flange of the wing section 30. The collar rides upon a spacer 46, and the pivot pin is secured within the opening 44 as by a roll pin 48 extending through the pivot pin beneath the flange. A shaft 49, secured at one end within the collar 40, slideably extends through a sleeve 50 having a pivot pin 52 extending through an opening 54 in the top flange 34. The sleeve rides upon a bearing spacer 56, and the pivot pin is secured for free rotation within the opening 54 as by a roll pin 58 extending through the pivot pin beneath the flange 34. A setscrew 60 threadably extends through the sleeve 50 so that its distal end may bear against the shaft 49. A jamb nut 62 is provided on the setscrew for bearing against the sleeve to selectively secure the setscrew against rotation. Thus, as will be readily apparent, by backing off the jamb nut and loosening the setscrew, the shaft can slip through the sleeve 50 to pivot the wing sections 30 about the hinges 32 to selected positions forwardly of, in alignment with, or rearwardly of the central blade 28 as desired. The wings can then be secured in the selected position by turning down the setscrew and tightening the jamb nut.

As indicated above the blade unit is attached to the suspension mechanism controlled by the lever 24, which conventionally includes pairs of forward and rear attaching links as shown in FIG. 1 for receiving connecting pins. It is highly desirable that the grader blade unit be adaptable for attachment to tractors of different sizes and types having suspension mechanisms which may have somewhat different dimensions. In addition, as heretofore indicated the blade is capable of being adjusted to various angles of attack. To those ends there is provided a mounting mechanism, identified generally at 64, including a lower turntable plate 66 affixed to the top flange 34 of the central blade 28, and an upper turntable plate 68 riding upon the lower plate. A king pin 70 extends through aligned openings in the upper and lower turntable plates and the flange 34, and permits the upper plate and the lower plate to rotate with respect to each other. A bushing 72 on the king pin bears against the upper turntable plate, and a washer 74 is provided on the king pin beneath the lower plate. The assembly is secured as by a roll pin 76 extending through the king pin. The lower plate 66 has a plurality of openings 67 spaced circumferentially about the king pin 70. The upper plate 68 has a single circumferential opening 69 positioned to register with the openings 67 on the lower plate 66. The lower plate 66 then can be rotated to a selected angular position relative to the upper plate 68. A pin 71 or other securing means is inserted through an opening in draw bar plate 82 to secure the draw bar 78 to the upper plate 68 and to retain the lower plate 66 and grader blade 28 in the selected angular position.

An extensible draw bar member 78 is telescopically received within an outer tubular section 80 which, in turn, is affixed to the upper turntable plate 68 by a plate 82. Spaced, mating openings 84 and 86 extend transversely through the extendable draw bar 78 and the tubular section 80, respectively, for removably receiving a pin 88. Thus, the draw bar can be adjusted in length as necessary to adapt the grader blade attachment for different mounting systems.

In order to attach the grader blade to the aforementioned attaching mechanism of the tractor, an adjustable mounting yoke 90 is provided on the forward end of the draw bar 78. More specifically, the mounting yoke comprises a cross bar 92 affixed to the draw bar, with links 94 connected to the cross bar for sliding in and out movement therealong as by collars 96. The links have upturned end sections 98 within which openings 100 are provided for receiving pins (not shown) to connect the yoke to the tractor attaching mechanism. The links can be moved axially along the cross bar to adjust the spacing between the opposite end sections 98 as required for a particular tractor. A similar adjustable yoke 102 is provided for connecting the grader blade attachment to the rear connecting links of the tractor. A cross bar 104 is affixed to the upper turntable plate 68 as by welding, and links 106 are affixed to the crossbar as by collars 108 for sliding in and out movement. End plates 110 affixed to the links have openings 112 for receiving pins (not shown) to attach the yoke to the rear tractor links.

Thus, as will be readily apparent by adjusting the draw bar section 78 and the front and rear yokes 90 and 102, the grader blade attachment can be adapted for mounting upon different tractors.

The linkage mechanism carried by such tractors for mounting mower decks generally provides for a certain amount of shifting in order to permit the mower deck to better follow the contour of the ground. This capability of the tractor linkage mechanism may be utilized to tilt or slope the grader blade during its use if desired. To that end, stirrups or foot rests 114 may be mounted upon the central blade 28 at opposing ends whereby the operator 22 may apply foot pressure to one or the other ends of the blade to depress that end of the blade. In order to facilitate mounting and dismounting of the grader blade attachment, the stirrups preferably slip into stake pockets 116 carried by the blade 28 so that they can be easily removed.

It will thus be apparent that in accordance with the invention there is provided a grader blade attachment or unit for lawn and garden tractors which is adaptable to different tractors and which can be readily attached to such tractors in place of the mower deck commonly employed with the tractors. The angle of attack of the blade can be selectively set to push material to the right, to the left or straight ahead as the blade advances. The slope of the blade from end to end can be controlled by use of the foot stirrups. The wing sections can be angularly adjusted to function as linear extensions of the central blade, or angled to confine or distribute material pushed ahead of the blade.

It is to be understood that the form of the invention herewith shown and described is to be taken as an illustrative embodiment only of the same, and that various changes in the shape, size and arrangement of parts may be resorted to without departing from the spirit of the invention.

What is claimed is:

1. A tractor blade unit adapted for mounting on small tractors in place of an underslung mower deck, comprising a turntable, a grader blade carried by the turntable and mounted for pivoting movement to selected angular positions thereon, a drawbar affixed to the turntable, a front yoke affixed to the drawbar, and a rear yoke affixed to the turntable, the front and rear yokes including a pair of opposite end sections for attaching said front and rear yokes to the tractor, and at least one of said yokes is adjustable in width for selectively changing the spacing between said end sections.

2. A grader blade unit as claimed in claim 1, wherein said turntable comprises a lower plate affixed to said grader blade and an upper plate for mounting said drawbar and said rear yoke, said upper and lower plate rotate with respect to each other.

3. A grader blade unit as claimed in claim 2, wherein said drawbar and said rear yoke are affixed to said upper plate.

4. A grader blade unit as claimed in claim 2, including a king pin extending through said upper and lower plates about which said upper plate is pivotable upon said lower plate, a plurality of first openings in said lower plate spaced circumferentially about said king pin, a second opening in said upper plate positioned to register with a selected one of said first openings as said upper plate is rotated to selected angular positions relative to said lower plate, and pin means removably received in said registering first and second openings to secure said upper plate in said selected angular position relative to said lower plate.

5. A grader blade unit as claimed in claim 1, wherein said drawbar is selectively adjustable in length.

6. A grader blade unit adapted for mounting on small tractors in place of an underslung mower deck, comprising a turntable, a grader blade carried by the turntable and mounted for pivoting movement to selected angular positions thereon, a drawbar affixed to the turntable, a front yoke affixed to the drawbar, a rear yoke affixed to the turntable, the front and rear yokes each including mounting means for attaching said front and rear yokes to the tractor, a wing section hingedly affixed to each end of said grader blade for swinging movement to selected angular positions relative to said grader blade, and a manually adjustable clamping means mounted at each end of said grader blade for interconnecting a top edge of said grader blade to a top edge of said wing section.

7. The grader blade unit as claimed in claim 6, wherein said grader blade and said wing sections are formed by inverted L-shaped angle sections having a vertical blade segment and a horizontal top flange.

8. The grader blade unit as claimed in claim 7, wherein the top flange at each end of said grader blade is cut at an angle to facilitate the positioning and clamping of said wing sections.

9. The grader blade unit as claimed in claim 7, wherein each of said manually adjustable clamping means includes a shaft having a first end adjustably secured to said grader blade and a second end secured to said wing section, said grader blade having a set screw mechanism mounted on the top flange to lock the shaft whereby said wing section is maintained at a selected angular position relative to said grader blade.

10. A grader blade unit adapted for mounting on small tractors in place of an underslung mower deck, comprising a turntable having a lower plate and an upper plate pivotably connected by a king pin, the upper and lower plates rotate with respect to each other; a grader blade affixed to the lower plate of said turntable; means for securing said grader blade at selected angular positions on said turntable; an adjustable length drawbar affixed to the upper plate of said turntable; a front yoke affixed to the drawbar and a rear yoke affixed to the upper plate of said turntable for attachment to the tractor; and a foot stirrup secured on each end of said grader blade and extending vertically therefrom, said stirrups positioned for supporting feet of a driver such that the driver may selectively transmit manual force to one of said stirrups to provide for a transverse inclination of said grader blade; and wherein each of said foot stirrups includes a stake pocket secured to the end of said grader blade and an L-shaped removable stake mounted in the stake pocket.

11. The grader blade unit as claimed in claim 10, wherein said means for securing said grader blade at selected angular positions on said turntable includes a plurality of openings formed in the lower plate and spaced circumferentially about said king pin, a single circumferential opening formed in the upper plate and positioned to register with the openings in the lower plate as the lower plate is rotated to selected angular positions relative to said upper plate, and a pin removably received in the registered openings in the lower plate and the upper plate to secure said grader blade at the desired angle.

12. The grader blade unit as claimed in claim 10, including a wing section hingedly affixed to each end of said grader blade for swinging movement to selected angular positions relative to said grader blade, and a manually adjustable clamping means mounted at each end of said grader blade for interconnecting a top edge of said grader blade to a top edge of said wing section.

* * * * *